US011905744B2

(12) United States Patent
Reusch et al.

(10) Patent No.: US 11,905,744 B2
(45) Date of Patent: Feb. 20, 2024

(54) METHOD FOR OPERATING A MOTOR VEHICLE LOCKING SYSTEM

(71) Applicant: Kiekert AG, Heiligenhaus (DE)

(72) Inventors: Manuel Reusch, Düsseldorf (DE); Michael Scholz, Essen (DE)

(73) Assignee: Kiekert AG, Heiligenhaus (DE)

( * ) Notice: Subject to any disclaimer, the term of this patent is extended or adjusted under 35 U.S.C. 154(b) by 254 days.

(21) Appl. No.: 17/420,223

(22) PCT Filed: Jan. 10, 2020

(86) PCT No.: PCT/DE2020/100014

§ 371 (c)(1),
(2) Date: Jul. 1, 2021

(87) PCT Pub. No.: WO2020/143882

PCT Pub. Date: Jul. 16, 2020

(65) Prior Publication Data

US 2022/0090417 A1 Mar. 24, 2022

(30) Foreign Application Priority Data

Jan. 11, 2019 (DE) ..................... 10 2019 100 592.2

(51) Int. Cl.
*E05B 81/06* (2014.01)
*E05B 81/14* (2014.01)
(Continued)

(52) U.S. Cl.
CPC .............. *E05B 81/06* (2013.01); *E05B 81/14* (2013.01); *E05B 81/58* (2013.01); *E05B 81/66* (2013.01); *E05B 81/72* (2013.01)

(58) Field of Classification Search
CPC .......... E05B 81/06; E05B 81/20; E05B 81/66; E05B 81/14; E05B 81/58; E05B 81/72
(Continued)

(56) References Cited

U.S. PATENT DOCUMENTS

2003/0080569 A1* 5/2003 Raymond .............. E05B 81/20 292/201
2004/0130315 A1* 7/2004 Lamb ...................... E05B 81/70 324/207.2
(Continued)

FOREIGN PATENT DOCUMENTS

DE 19702206 A1 2/1998
DE 10065100 A1 * 7/2002 ............ E05B 81/66
(Continued)

OTHER PUBLICATIONS

Translation of International Search Report dated Apr. 30, 2020, for International Patent Application No. PCT/DE2020/100014.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A method for operating a motor vehicle locking system, particularly for acting upon a motor vehicle cover and preferably a motor vehicle door for the purpose of locking it. A drive for the cover is acted upon depending on a pre-locked position and a fully latched position of the cover determined by a sensor. According to the invention, a sensor detects the over-travel beyond the fully latched position, resulting in the motor being driven in a reverse direction irrespective of the previously assumed fully latched position.

15 Claims, 6 Drawing Sheets

(51) Int. Cl.

| | |
|---|---|
| ***E05B 81/58*** | (2014.01) |
| ***E05B 81/66*** | (2014.01) |
| ***E05B 81/72*** | (2014.01) |

(58) Field of Classification Search
USPC .......................................................... 292/216
See application file for complete search history.

(56) References Cited

U.S. PATENT DOCUMENTS

| | | | | |
|---|---|---|---|---|
| 2014/0225382 | A1* | 8/2014 | Kurita | E05B 81/20 292/201 |
| 2018/0058128 | A1* | 3/2018 | Khan | E05F 15/42 |
| 2018/0276921 | A1* | 9/2018 | Haber | G07C 5/0858 |

FOREIGN PATENT DOCUMENTS

| | | | | |
|---|---|---|---|---|
| DE | 10065100 | A1 | 7/2002 | |
| DE | 102004007998 | A1 * | 9/2004 | E05B 81/20 |
| DE | 102004007998 | A1 | 9/2004 | |
| DE | 102011119579 | A1 | 5/2013 | |
| WO | 2017153835 | A1 | 9/2017 | |
| WO | WO-2017153835 | A1 * | 9/2017 | E05B 81/20 |

* cited by examiner

METHOD FOR OPERATING A MOTOR VEHICLE LOCKING SYSTEM

This application is a national phase of International Application No. PCT/DE2020/100014 filed Jan. 10, 2020, which claims priority to German Patent Application No. 10 2019 100 592.2 filed Jan. 11, 2019.

FIELD OF DISCLOSURE

The invention relates to a method for operating a motor vehicle locking system, particularly for acting upon a motor vehicle cover, preferably a motor vehicle door for the purpose of locking it, wherein a drive for a motor vehicle lock of the cover is acted upon depending on a pre-locked position and a fully latched position of the motor vehicle lock determined by a sensor.

BACKGROUND OF DISCLOSURE

The motor vehicle cover described above is generally a motor vehicle door. This in turn can be designed as a motor vehicle side door, motor vehicle tailgate, motor vehicle front hood, etc. The term "motor vehicle cover" also includes, for example, motorized lockable flaps of a cargo space, tank flaps, closing flaps for an electrical connection, etc.

The determination by a sensor of both the pre-locked position and the fully latched position of the motor vehicle lock of such a cover is of particular importance in practice. Because for the most part in the fully latched position of the cover in question and, correspondingly, mostly in the main ratchet position of an associated motor vehicle lock, the associated motor vehicle cover and, in particular, the motor vehicle door are reliably prevented from opening in the event of an impact. Only then can any safety measures such as side impact protection and side airbags develop their full effect at the same time. In this way, not only are the occupants protected, but the motor vehicle covers and in particular motor vehicle doors can undergo an intended deformation together with the body to which they are hinged in the event of such an impact. In addition, security-relevant components and the function thereof are often associated to the assumption of the fully latched position. In this case, these are, for example, side airbags, steering wheel airbags, seat belt tensioners, etc. The same generally applies to an alarm system for theft protection.

In practice, there are a plurality of requirements in this context. First of all, so-called sham locks should be reliably detected. Such a sham lock corresponds to the fact that the motor vehicle cover in question is closed, although, for example, a pawl is lifted as part of a locking mechanism of the associated motor vehicle lock. In the event of such a false closure and a vibration of the associated motor vehicle cover, it can pop open.

In addition, it is important in practice to implement reliable anti-jamming protection. In other words, during the closing operation of the relevant motor vehicle cover, it is not allowed that, for example, a finger, an item of clothing, etc. of an operator is pinched and clamped. This can result in injury to the person. Rather, an effective anti-jamming protection corresponds to the fact that the motor acting upon the motor vehicle cover is driven in a reverse direction so that the motor vehicle cover and in particular the motor vehicle door is opened and the finger or an item of clothing is immediately exposed.

Finally, other scenarios are also conceivable, which correspond or can correspond to an overload of the drive, for example. Such a scenario is observed, for example, when the fully latched position cannot be reached. This is the case when the motor vehicle cover cannot be brought into a locked position with respect to the motor vehicle body because the motor vehicle cover is deformed, for example, or foreign bodies are adhering to the body, which would result in complete closure of the motor vehicle cover and would prevent the reaching of the fully latched position.

A method for operating a motor vehicle locking system of the type described at the outset is described by way of example in DE 10 2011 119 579 A1 by the applicant. This relates, among other things, to a method for electromotive operation of a motor vehicle door. At least one sensor is provided which controls an electric motor as part of a drive device for a door leaf. In addition, a further second sensor, which is hierarchically higher than the first sensor, is implemented. By means of this superordinate sensor, activation of the electric motor can be interrupted.

A comparable teaching is described in DE 100 65 100 A1. This relates to a motor vehicle door lock which is provided with an influencing magnet as a sensing element for a stationary sensor. In this way, both a fully latched position and a pre-locked position can be detected.

SUMMARY OF DISCLOSURE

The state of the art has basically proven itself, but then reaches its limits when, in particular, overloads of the drive are to be reliably detected and controlled. For this reason, the present invention is based on the technical problem of further developing a method of this type in such a way that, in particular, overloads of the drive and/or jamming scenarios are mastered and do not result in destruction of the drive and/or injury to a person.

To solve this technical problem, a generic method for operating a motor vehicle locking system within the scope of the invention is characterized in that a sensor detects the over-travel beyond the fully latched position, resulting in the motor being driven in a reverse direction irrespective of the previously assumed fully latched position.

According to an advantageous embodiment, a normal locking process corresponds to the over-travel behind the fully latched position, which over-travel is determined by a sensor. In contrast, a cancelled normal locking process due to overload corresponds to the over-travel determined by a sensor when the fully latched position is not assumed.

In the scope of the invention, an overload of the drive for the motor vehicle cover is reliably detected, resulting in the motor being driven in a reverse direction according to the method. As soon as the over-travel beyond the fully latched position is determined by a sensor, this process corresponds either to the normal locking process or to a cancelled normal locking process. In both cases, the over-travel beyond the fully latched position results in the drive being reversed, i.e. the motor being driven in a reverse direction. This happens irrespective of the fully latched position previously assumed.

If first the fully latched position and then the over-travel beyond the fully latched position are detected in this sequence by a sensor, this functional sequence corresponds to a normal locking process. If, however, a sensor detects the over-travel, although the fully latched position has not yet been reached or if the fully latched position has not been assumed, the cancelled normal locking process described above corresponds thereto. The over-travel, which is generally assumed by the motor vehicle cover beyond the fully latched position, corresponds to an overload applied to the drive when the fully latched position is not assumed or is not detected by a sensor.

Such an overload can arise and be observed, for example, in that the motor vehicle cover is deformed, for example, and the over-travel beyond the fully latched position is detected and determined by a sensor in the region of this deformation. In other words, in this case a sensor signal belonging to the over-travel beyond the fully latched position is observed although the fully latched position has not (yet) been reached at all due to a jamming and/or overloading of the motor vehicle cover. For this purpose, the fully latched position is usually detected via a main ratchet position of a motor vehicle lock provided on the motor vehicle cover, which main ratchet position is determined by a sensor.

In any case, the described scenario with the over-travel which is determined by a sensor and is beyond the fully latched position due to the described deformation of the motor vehicle cover when the fully latched position or main ratchet position of the associated motor vehicle lock is not assumed at the same time, without countermeasures, results in the drive being energized unchanged and at some point being damaged or damageable. According to the invention, however, this functional sequence is interpreted as a cancelled normal locking process and results—like the normal closing process—overall in the motor being driven in a reverse direction.

Destruction of the drive and/or injury to a person can consequently be reliably ruled out. All of this succeeds and is also observed in the event that the fully latched position has not previously been assumed or has not been detected by a sensor. This increases the functional reliability considerably.

According to a further advantageous embodiment, in addition to the over-travel beyond the fully latched position, a further first locked position between the pre-locked position and the fully latched position can be determined by a sensor. So-called anti-jamming protection can regularly be realized and implemented via the first locked position. In other words, as soon as the motor vehicle cover reaches the first locked position between the pre-locked position and the fully latched position and this first locked position is determined by a sensor, this regularly corresponds to a position of the motor vehicle cover relative to the body in such a way that only a gap remains in which neither the fingers of an operator nor articles of clothing can be jammed. If this gap documented by the first locked position has been safely reached and determined by a sensor, the drive continues to be energized, unchanged, in order to assume the fully latched position. If, on the other hand, the first locked position between the pre-locked position and the fully latched position is not reached, this is interpreted as the presence of jamming. As a result, the drive is reversed immediately in order to release the motor vehicle cover and to prevent it from jamming.

The assumption of the pre-locked position, which is determined by a sensor, generally starts the drive. The drive is usually a closing drive. The drive or closing drive is acted upon by an electric motor, which in turn is addressed by a control unit. For this purpose, the control unit evaluates signals from the at least one sensor.

In addition, the motor vehicle cover is advantageously equipped with a motor vehicle lock. If the motor vehicle cover is a motor vehicle door, the motor vehicle lock is logically designed as a motor vehicle door lock. Either way, the motor vehicle lock or motor vehicle door lock has a locking mechanism consisting substantially of a rotary latch and a pawl. In addition, at least one sensor is provided, by means of which the position of the locking mechanism is determined in each case. As a rule, the sensor is assigned to the rotary latch or an additional element which follows the movements of the rotary latch. The additional element may be a switching cam. By means of the switch cam, for example, a switch can be operated as a further sensor, by means of which the assumption of the fully latched position or main ratchet position of the rotary latch and consequently of the locking mechanism inside the motor vehicle lock is detected by a sensor and transmitted to the control unit already described above. The switching cam may now in turn be equipped with a sensing element.

The sensor, like the sensing element, can be arranged in an electrical component carrier as part of the motor vehicle lock. In principle, an arrangement of the sensor or sensing element in or on the motor vehicle cover and preferably the motor vehicle door is also possible. An arrangement in or on a lock holder is also conceivable.

In fact, the one or more sensors are advantageously Hall sensors. In this case, the sensing element in the form of a permanent magnet, for example, generates a varying magnetic flux in the associated stationary Hall sensor or sensor.

Alternatively, the sensor can also be a resistance sensor. In this case, the sensing element ensures that a changing electrical resistance is generated in the sensor. Alternatively or in addition, the sensing element can also generate a different and varying optical light intensity in the sensor if the sensor is designed as an optical sensor which reacts to changes in the reflection of the sensing element, for example. In addition to the previously described sensor inside the motor vehicle lock, which determines movements of the locking mechanism substantially consisting of the rotary latch and the pawl, a sensor can also be provided on the motor vehicle cover. It is also possible to place the sensor in question between the motor vehicle cover and the associated body of the motor vehicle, to which the motor vehicle cover is connected rotatably or in an articulated manner.

As already explained, the one or more sensors are advantageously a Hall sensor. The Hall sensor in turn is composed of the movable sensing element and the stationary sensor. The sensing element, for its part, works without contact on the sensor and for this purpose may have a permanent magnet or also an electromagnet, which generates a varying magnetic flux in the sensor or Hall sensor in accordance with the movement thereof. Alternatively or additionally, however, the sensing element can also generate a changing electrical resistance and/or a different optical light intensity in the sensor, as has already been described above.

The sensing element is particularly preferably designed as a magnet (permanent magnet or electromagnet) and magnetized in such a way that during the movement thereof within the sensor range of the sensor, the north pole first reaches the sensor range and, near the end of the movement, the south pole reaches the sensor range, or vice versa. The north pole and the south pole are interchangeable. In this way, it can be achieved that an initially weak magnetic field becomes stronger by means of the rotary movement, so that position detection is possible in this way. The magnet (permanent magnet or electromagnet) is accordingly designed in the geometric configuration thereof in such a way that a first region, in particular a beginning, forms the north pole and a second region of the magnet, in particular an end of the magnet, forms the south pole. For example, the south pole can generate a strong magnetic field, whereas the north pole generates a weaker magnetic field in comparison. The position of the magnet and thus of the sensing element can then be derived from the strength of the magnetic field. This way of recognition allows for a simple and inexpensive design through a corresponding magnetization of the magnet.

As a result, a method for operating a motor vehicle locking system and a correspondingly designed motor vehicle locking system are provided. This system makes use of at least one sensor. By means of the at least one sensor, the pre-locked position, the fully latched position, the first locked position between the pre-locked position and the fully latched position, and finally the over-travel beyond the fully latched position (mostly in the over-travel range) are determined by a sensor. The sensor signals in question are evaluated by the control unit and result in a corresponding application of the electric motor as part of the drive.

In principle, it is also possible to work with a plurality of sensors. As a rule, at least one sensor is provided on the rotary latch or the rotary latch has a sensing element attached thereto or moved therewith, the movements of which are detected by a stationary sensor. The movements of the sensing element and consequently of the rotary latch then correspond to a varying magnetic flux or a changing electrical resistance and/or a different optical light intensity in the sensor, as has already been described in detail. From these temporally different sensor signals, depending on the position of the rotary latch, the control unit can derive the scenarios already described above and act accordingly on the electric motor as part of the drive. Herein lie the essential advantages.

BRIEF DESCRIPTION OF DRAWINGS

The invention is explained in greater detail below with reference to drawings, which show only one exemplary embodiment. In the drawings.

DETAILED DESCRIPTION

Figure 1:
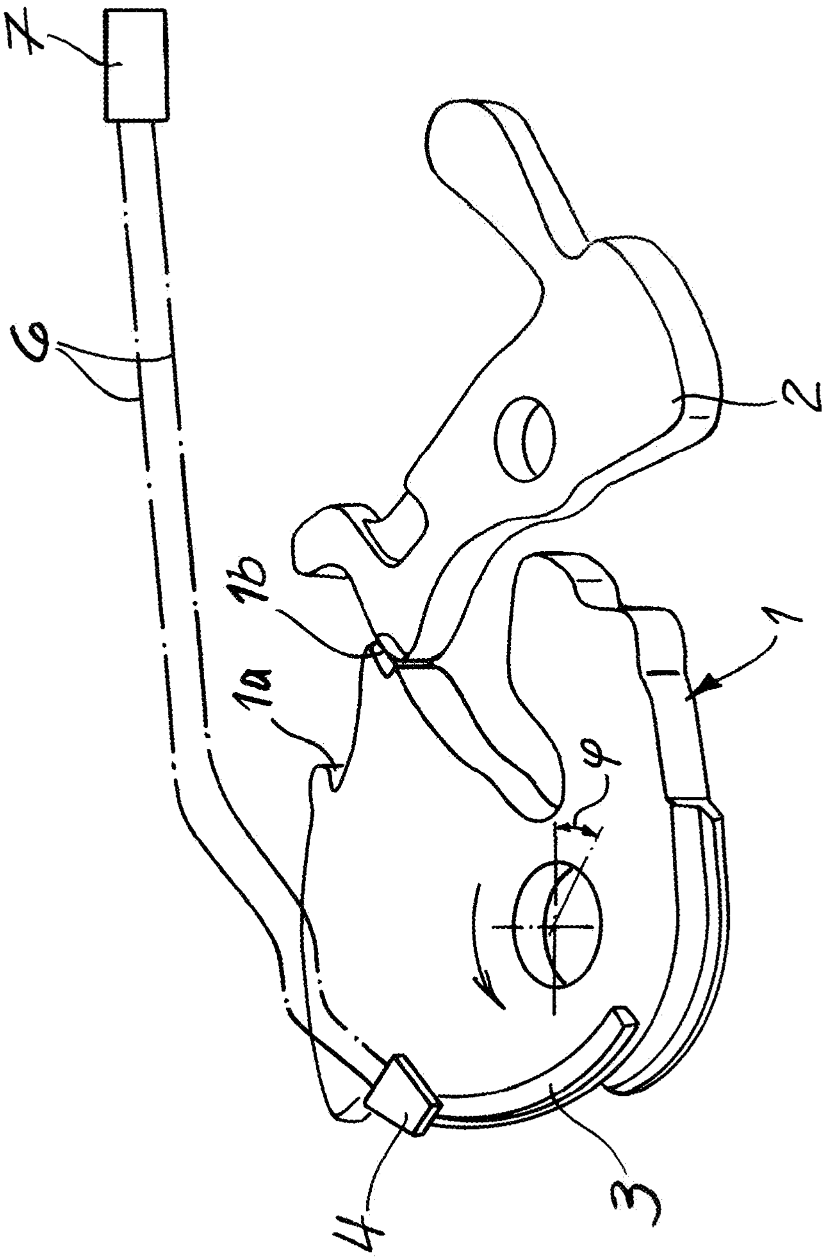
FIG. 1 shows the motor vehicle locking system according to the invention or an associated method for the operation thereof in the context of a first embodiment variant.
Figure 2:
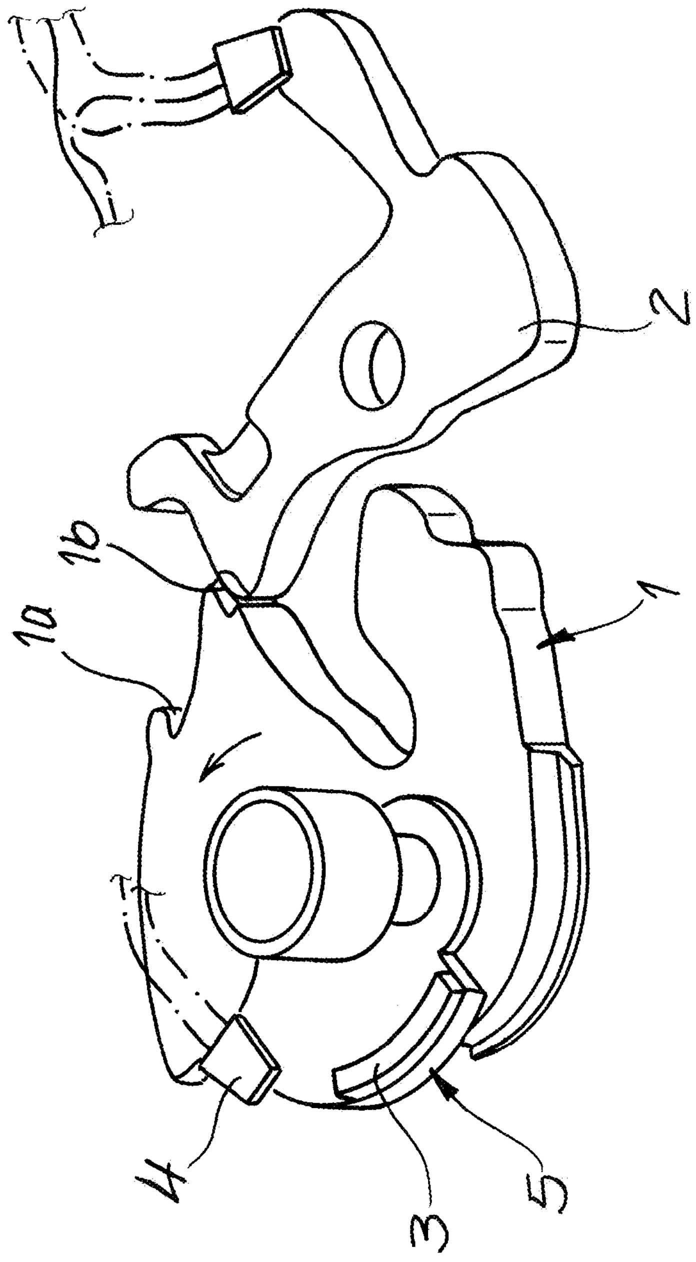
FIG. 2 shows the object of FIG. 1 in a modified embodiment.
Figure 3:
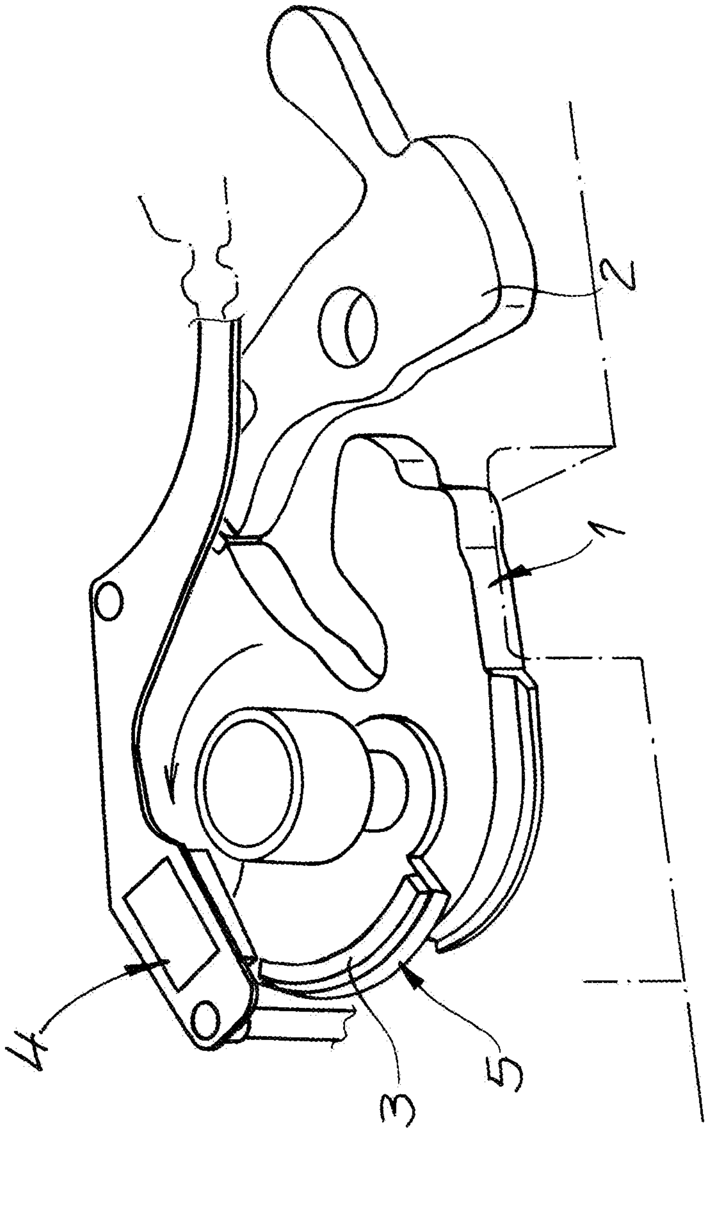
FIG. 3 shows a further modified variant.

The drawings show a motor vehicle locking system and specifically a motor vehicle cover in the form of a motor vehicle door T having an associated drive for closing the motor vehicle cover or the motor vehicle door T in question. The drive in question has an electric motor, by means of which, according to the exemplary embodiment, a rotary latch 1 shown in FIG. 1 to 3 is closed as part of a locking mechanism 1, 2 from said rotary latch 1 and a pawl 2 in the exemplary embodiment. The locking mechanism 1, 2 belongs to a motor vehicle lock on the motor vehicle door T.

In other words, the drive (not explicitly shown) works on the rotary latch 1 in question for closing the associated motor vehicle lock and consequently the cover equipped with the motor vehicle lock in the form of the motor vehicle door T in the example in such a way that the rotary latch 1 in question is in each case acted upon counterclockwise in the direction of the arrow around the axis thereof. In other words, the counterclockwise movement of the rotary latch 1 drawn in FIG. 1 to 3 and caused by the drive corresponds to the associated motor vehicle cover being acted upon for the purpose of locking it. During this process, the motor vehicle cover in question, or the motor vehicle lock shown in FIG. 1 to 3, and therefore the locking mechanism 1, 2 thereof, go from a pre-locked position to a fully latched position of the motor vehicle cover. The pre-locked position corresponds to the fact that the pawl 2 engages in a pre-ratchet 1*a* of the rotary latch 1. In contrast, the fully latched position is part of the fact that the pawl 2 interacts with a main ratchet 1*b* of the rotary latch 1 as shown in FIG. 1 to 3.

FIG. 1 to 3 show that the locking mechanism 1, 2 or the rotary latch 1 thereof and consequently the motor vehicle lock as a whole is equipped with a sensor 3, 4. According to the exemplary embodiment, the sensor 3, 4 is a Hall sensor which, in detail, is composed of a movable sensing element 3 on the one hand and a stationary sensor 4 on the other hand. The movable sensing element 3 can be attached directly to the rotary latch 1, as shown in FIG. 1. However, it is also possible that the sensing element 3 is attached to an additional element 5 which moves together with the rotary latch 1, which additional element is a switching cam in the context of the exemplary embodiments according to FIGS. 2 and 3. In principle, of course, the sensor 4 can also be moved together with the rotary latch 1 and, on the other hand, the sensing element 3 can be designed to be stationary. In the exemplary embodiment and not by way of limitation, the sensing element 3 is an arcuate permanent magnet.

As soon as the sensing element 3 or the arcuate permanent magnet moves relative to the stationary sensor 4, specifically in accordance with the movement of the rotary latch 1, the movement of the sensing element 3 ensures that a varying magnetic flux is generated in the stationary sensor 4. This varying magnetic flux depends on the angle of rotation φ of the rotary latch 1 with respect to the stationary sensor 4. At least in specific areas of the angle of rotation φ of the rotary latch 1, there is a linear dependence of the flux density scanned by the stationary sensor 4 and consequently the voltage U present on the output side of the sensor 4 in the sense of $$U \propto \varphi$$

is observed. In other words, depending on the angle of rotation position or angle of rotation φ of the rotary latch 1, a voltage U is established on the output side of the stationary sensor 4, which can be evaluated by a control unit 7 with the aid of connecting lines 6 and is proportional to the angle of rotation φ.

In this way, a distinction cannot only be made between the pre-locked position or pre-ratchet position when the pawl 2 engages in the pre-ratchet 1*a* of the rotary latch 1 and the fully latched position or main ratchet position when the pawl 2 engages the main ratchet 1*b* of the rotary latch 1. Rather, intermediate positions in the sense of a first locked position between the pre-locked position and the fully latched position can also be determined by a sensor with the aid of the Hall sensor 3, 4, as well as at least one further over-travel. This corresponds to the fact that the rotary latch 1 assumes a position beyond the fully latched position or main ratchet position assumed in each case in FIG. 1 to 3. This over-travel corresponds to the fact that the rotary latch 1, for example in the illustration according to FIG. 1, is pivoted further counterclockwise by a specific angle beyond the fully latched position or main ratchet position, which generally corresponds to a so-called over-travel position. In any case, these four positions, i.e. the pre-locked position, the fully latched position, the first locked position between the pre-locked position and the fully latched position, and finally the over-travel beyond the fully latched position can differ from one another and can be accordingly associated to the rotary latch 1 based on the linear dependence of the voltage U on the output side of the stationary sensor 4 depending on the angle of rotation φ.

Figure 4:
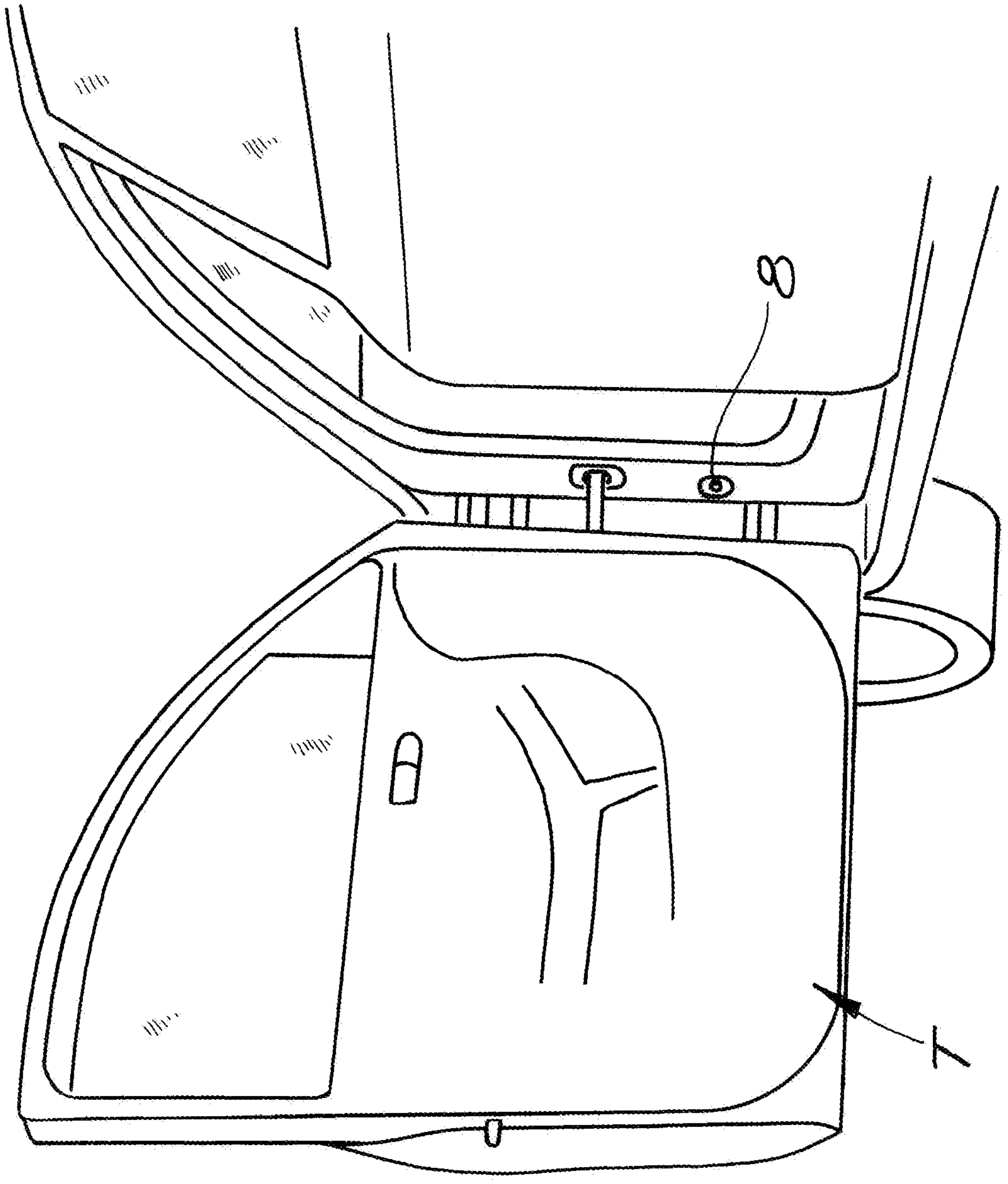
FIGS. 4 and 5 show additional variants of the invention in the form of a sensor on the motor vehicle cover or on the motor vehicle body.
Figure 5:
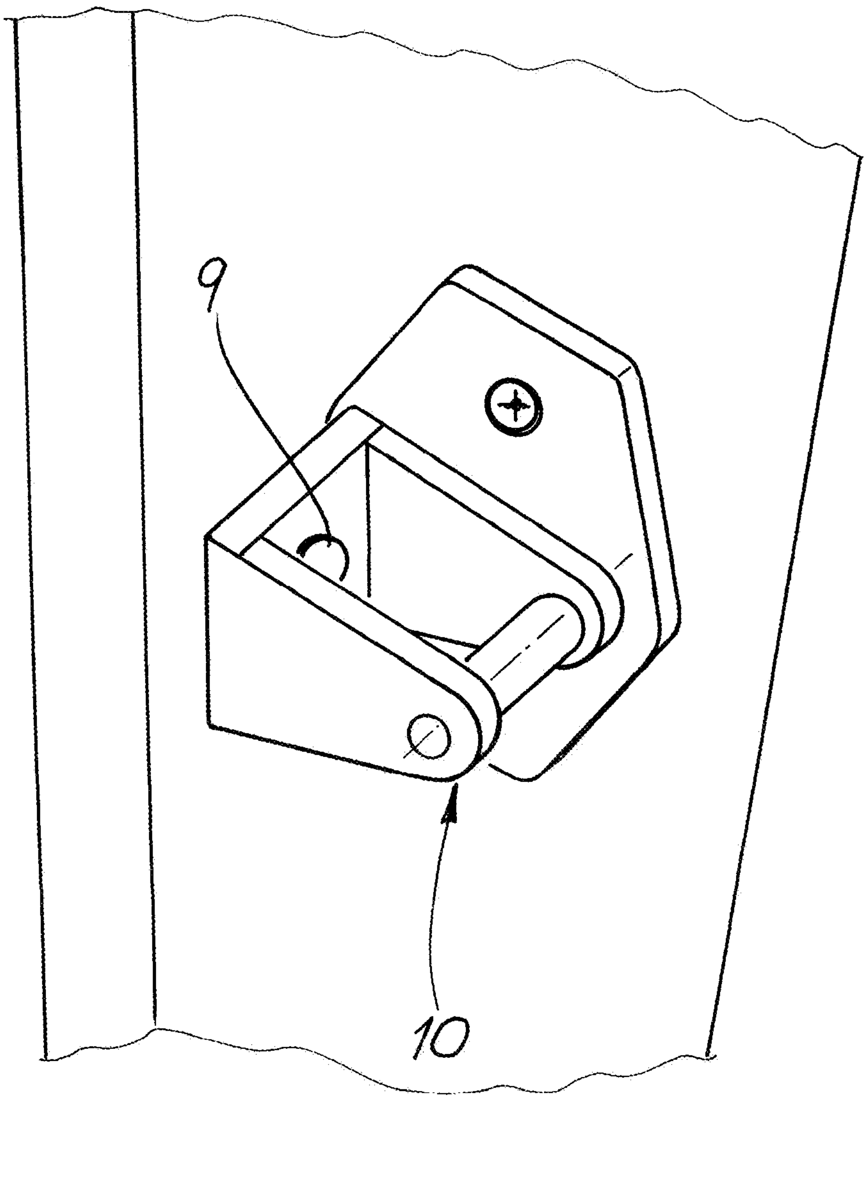

In principle, a further sensor 8 can also be provided in addition to the one sensor 3, 4 or Hall sensor 3, 4. This additional sensor 8 can be assigned to the motor vehicle door T indicated in FIG. 4 or 5 and belonging to the motor vehicle lock and can be arranged in the motor vehicle door T in question or on a motor vehicle body also shown in this case in the entrance region. As an alternative thereto, it is also possible to attach a further sensor 9 in or on a lock holder 10 shown in this case (in FIG. 5). By means of the additional sensors 8, 9, as an alternative or in addition to the sensor 3, 4 assigned to the rotary latch 1 and already described above, the assumption of the individual positions, i.e. the pre-locked position, the first locked position, the fully latched position, and finally the over-travel can be detected and determined by a sensor. In principle, of course, combinations are also conceivable. In this case, not only the sensor 3, 4 assigned to the rotary latch 1 is provided, but the sensor 8 assigned to the motor vehicle door T and finally the further sensor 9 can also be implemented near or in the lock holder 10. These are also individually able to detect the functional positions described in detail above by means of a sensor.

Figure 6:
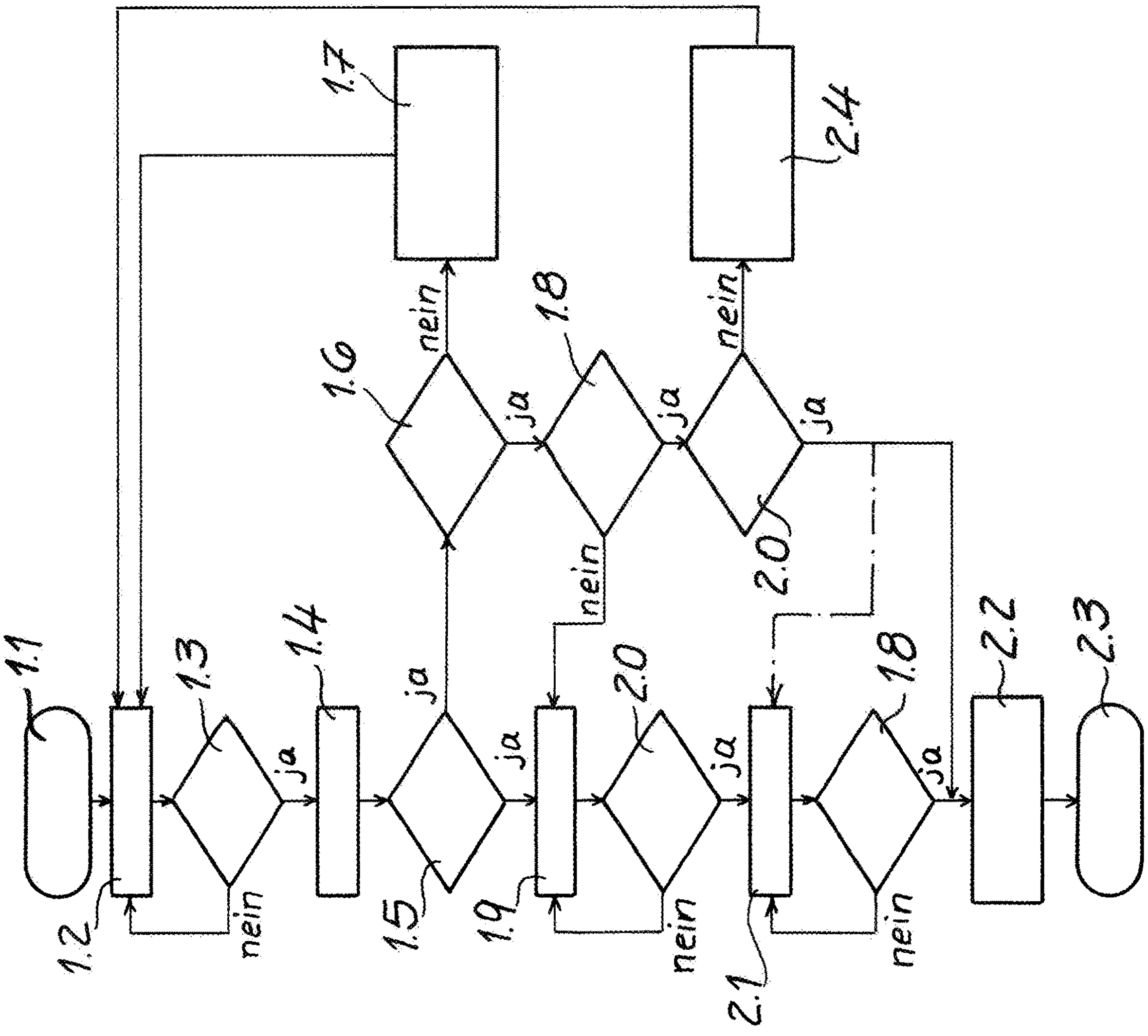
FIG. 6 shows a schematic flowchart according to which the operating method according to the invention preferably works.

The way it works is as follows. In FIG. 6, a flowchart is shown which exemplarily explains in more detail a closing operation of the motor vehicle door T and thus the method according to the invention. After starting in program point 1.1, the motor vehicle door T in question can first be closed manually in point 1.2. As a rule, this has the consequence that the locking mechanism 1, 2 or the pawl 2 engages in the pre-ratchet 1*a* on the rotary latch 1.

A corresponding determination at the time 1.3 takes place as to whether a pre-ratchet signal is being observed. According to the exemplary embodiment, the pre-ratchet signal is determined by means of the sensors 3, 4. This includes a corresponding voltage U sensed by the control unit 7 on the output side of the sensor 3, 4 and a corresponding angle of rotation φ of the rotary latch 1.

In the event that the pre-ratchet signal has been determined in the program point 1.3 and the pre-ratchet position or pre-locked position has accordingly been assumed, the drive is then started in the control point 1.4. If the pre-ratchet signal according to 1.3 is not available, the motor vehicle door must be actuated manually again according to 1.2.

Following the start of the drive for the cover or the motor vehicle door T in point 1.4, a check is made in the subsequent point 1.5 as to whether the first locked position is between the pre-locked position or pre-latched position according to 1.3 and the fully latched position or main ratchet position to be explained in more detail below has been reached. The first locked position and the determination 1.5 thereof corresponds to the anti-jamming protection. If the first locked position is observed and is present, it is checked in the program point 1.6 as to whether or not the sealing of the motor vehicle door T or the seal thereof has been achieved. If this is not the case, "jamming" takes place. The program, in this case, goes back to the control point 1.2 in point 1.7 and the drive is reversed in the program point 1.7.

A "jamming" event observed in this way results in the fact that the motor vehicle door T or the associated drive has to be relieved from load for the purpose of closing and consequently has to be reversed. However, if the motor vehicle door T in program point 1.6 assumes the locked position thereof corresponding to reaching the first locked position according to 1.5 in comparison to the body, which typically corresponds to a specific gap between the motor vehicle door T and the body, a check is carried out in the next program point 1.8 as to whether the over-travel has been reached or not. If this is not the case, the drive continues to be acted upon in the direction of closing in the program point 1.9. This program point 1.9 is also completed in the event that the first locked position in point 1.5 has not yet been reached and consequently the locking mechanism 1, 2 has to be closed further with the aid of the drive. This closing 1.9 process takes place until a main ratchet signal or the fully latched position is detected in program point 2.0. Like the pre-locked position and the first locked position, the fully latched position or the associated main ratchet signal is detected with the aid of the sensor 3, 4, which determines the position of the rotary latch 1.

As soon as the locking mechanism 1, 2 has assumed the fully latched position or main ratchet position thereof, the pawl 2 engages into the main ratchet 1*b*, as is shown in FIG. 1, for example. The main ratchet signal or the determination of the fully latched position in program item 2.0 corresponds to this situation. The same determination takes place following the determination of the over-travel in the program point 1.8 as soon as the over-travel has been reached. If it comes to the sequence that first the over-travel in program point 1.8 and then the fully latched position or the main ratchet signal according to 2.0 in this sequence are detected by the control unit 7, then the locking mechanism 1, 2 is closed and the program jumps to the program point 2.2 or 2.1. In the program point 2.2, the drive is reversed because the locking mechanism 1, 2 has assumed the fully latched position thereof, so that the closing operation can then be terminated in accordance with 2.3. According to the dash-dotted path, however, it is also possible that, after assuming the fully latched position according to 2.0, the locking mechanism 1, 2 is closed further in the program point 2.1 and then the over-travel is determined again in program point 1.8. If the determination is positive, the drive is reversed again according to 2.2, the locking mechanism 1.2 is closed, and the closing operation is terminated after 2.3.

If, however, the associated main ratchet signal is not detected after registering the over-travel according to 1.8 during the subsequent check of the assumption of the fully latched position in program point 2.0, this indicates that the motor vehicle door T is deformed, for example, and foreign bodies are located between the motor vehicle door and the body, or the like is observed. This has the consequence that, according to 2.4, the drive for the locking mechanism 1, 2 is reversed, because otherwise an overload can occur on the drive and possibly result in the destruction thereof. The drive then returns to the starting point or control point 1.2.

LIST OF REFERENCE SIGNS

- 1 Catch
- 1*a* Pre-ratchet
- 1*b* Main ratchet
- 1, 2 Locking mechanism
- 2 Pawl
- 3 Sensing element
- 3, 4 Sensor/Hall sensor
- 4 Rotation angle
- 5 Additional element
- 8, 9 Sensor

10 Lock holder
T Motor vehicle door
$\varphi$ Angle of rotation element
U Voltage

The invention claimed is:

1. A method for operating a motor vehicle locking system for acting upon a motor vehicle cover, the method comprising:

acting on a drive for a motor vehicle lock of the cover to drive the motor vehicle lock from a starting point depending on a pre-locked position and a fully latched position of the motor vehicle lock detected by a sensor;

detecting an over-travel position which is beyond the fully latched position of the motor vehicle lock via the sensor; and driving a motor in a reverse direction irrespective of a previously assumed fully latched position;

the method further comprising detecting via the sensor a normal locking process including a detection that the motor vehicle lock has reached the fully latched position and a detection that the motor vehicle lock has reached the over-travel position, wherein when there is a detection that the motor vehicle lock has reached the fully latched position and a detection that the motor vehicle lock has reached the over-travel position the motor is driven in reverse to move the motor vehicle lock to the fully latched position; and the method further comprising detecting via the sensor a cancelled normal locking process including a detection that the motor vehicle lock has reached the over-travel position in absence of a detection that the motor vehicle lock has reached the fully latched position, wherein when there is a detection that the motor vehicle lock has reached the over-travel position in absence of a detection that the motor vehicle lock has reached the fully latched position the motor is driven in reverse to move the motor vehicle lock to the starting point.

2. The method according to claim 1 further comprising detecting a first locked position between the pre-locked position and the fully latched position via the sensor.

3. The method according to claim 1 further comprising:

detecting an assumption of the pre-locked position via the sensor; and starting the drive if the sensor detects the pre-locked position.

4. The method according to claim 1 further comprising detecting a position of a locking mechanism of the motor vehicle lock, wherein the locking mechanism includes a rotary latch and a pawl.

5. The method according to claim 1 further comprising using an additional sensor provided near or in a region of the motor vehicle cover.

6. The method according to claim 1 further comprising using at least one Hall sensor.

7. The method according to claim 6, wherein using the at least one Hall sensor includes using a stationary sensor and a sensing element which influences a signal from the stationary sensor.

8. The method according to claim 7 further comprising generating a varying magnetic flux in the stationary sensor via the sensing element.

9. The method according to claim 7, wherein using the sensing element includes using a magnet and magnetizing the magnet, and moving the magnet within a sensor range so that first a north pole reaches the sensor range and, near an end of movement of the magnet, a south pole reaches the sensor range.

10. A motor vehicle locking system on a motor vehicle cover configured for performing the method according to claim 1, having the motor vehicle lock and the drive for the motor vehicle lock, wherein the drive is acted upon depending on the pre-locked position and the fully latched position of the motor vehicle lock determined by the sensor, wherein the sensor detects the over-travel position beyond the fully latched position, resulting in the motor being driven in a reverse direction irrespective of the previously assumed fully latched position.

11. The method according to claim 2 further comprising continuing operation of the drive to move the motor vehicle lock to the fully latched position when the first locked position is detected by the sensor.

12. The method according to claim 11 further comprising driving the motor in the reverse direction if the first locked position is not reached.

13. The method according to claim 7 further comprising operating the sensing element without contact on the sensor.

14. The method according to claim 4, wherein detecting the position of the locking mechanism includes using a movable sensing element attached to the rotary latch and a stationary sensor that detects movements of the movable sensing element.

15. The method according to claim 5, wherein using the additional sensor includes using a first additional sensor arranged in a motor vehicle door and/or a second additional sensor arranged on a lock holder.

* * * * *